Dec. 20, 1966 L. R. ALLEN ETAL 3,293,008
SUPERCONDUCTIVE COIL
Filed June 13, 1961

3,293,008
Patented Dec. 20, 1966

3,293,008
SUPERCONDUCTIVE COIL

Lloyd R. Allen, Belmont, and Robert A. Stauffer, Weston, Mass., assignors, by mesne assignments, to National Research Corporation, a corporation of Massachusetts Filed June 13, 1961, Ser. No. 116,842
1 Claim. (Cl. 29—183)

This application is in part a continuation of our copending application Serial No. 102,593 filed April 12, 1961, and our copending application, Serial No. 106,093, filed April 27, 1961, now abandoned.

The present invention relates to a novel article of manufacture and process for forming such an article.

The invention is more particularly directed to wire, strip and other formed materials useful as superconductors and particularly to materials capable of maintaining superconductivity in very high magnetic fields.

Accordingly, it is a principal object of the present invention to provide an improved superconductive wire or strip.

Another object of the invention is to provide a superconductive product which can be readily formed to manufacture coils, armatures and the like.

Still another object of the invention is to provide a process for producing such superconductors which combines accurate control of the manufacturing parameters with simplicity of operation.

Still another object of the invention is to provide a super conductive product which provides a large ratio of conductive surface area to cross-sectional area.

These and other objects of the invention will in part be obvious and will appear hereinafter.

The present invention accordingly comprises the product possessing the features, properties and the relation of components and the process involving the several steps and the relation and the order of one or more of such steps with respect to each of the others which are exemplified in the following detailed disclosure, and the scope of the application of which will be indicated in the claim.

For a fuller understanding of the nature and objects of the invention, reference should be had to the following detailed description taken in connection with the accompanying drawings wherein.

The superconductivity of the intermetallic compound $Nb_3Sn$ has been known for some time. However, its utility has been somewhat limited due to the extremely brittle nature of the compound. Recent advances have been made in the production of wires embodying the $Nb_3Sn$ compound by filling niobium tubes, for example, with mixtures of niobium powder and tin powder. This tube has to be then drawn into a wire, formed into the final shape such as toroids, coils and the like and finally heat-treated to produce reaction between the niobium powder and tin powder within the tube. The above process is expensive, awkward and furnishes a final product which cannot be further worked.

In the present invention, on the other hand, a fine niobium wire, for example, is coated with a thin layer of tin. By the term "fine wire" as used in the specification and claim it is meant a wire, flat or round and being on the order of .010 inch or less in diameter or thickness. The wire is then heated to an elevated temperature on the order of 850° C. to 950° C. for at least 16 hours and preferably longer to cause the tin to diffuse into the niobium. The diffusing tin reacts with the niobium to form a layer or surface stratum of the $Nb_3Sn$ compound. The layer or surface stratum of $Nb_3Sn$ must be thick enough so as to exhibit superconductivity. The maximum thickness of the stratum of niobium-tin compound depends upon the desired degree of flexibility of the compound layer on the final wire product. The thickness of the stratum can be regulated by controlling one of the three variables of (*a*) the amount of tin, (*b*) the diffusion temperature and (*c*) the diffusion time. A number of fine wires prepared in the above manner are then woven together to form a single superconductive braided wire or cable. The wires are preferably woven noninductively. The number of fine wires used depends upon the desired degree of conductivity of the braided superconductor and depends on the diameter of a single wire and the number woven into the cable.

The details of the individual wires and the process of making them are more fully disclosed in our copending applications, S.N. 102,593 and S.N. 106,093, now abandoned, and our copending application S.N. 133,653, filed August 24. 1961, now abandoned. It should be understood that the wires, per se, do not form the basis of the present invention. The present invention is based on a new technique for utilizing wires of the type set forth in the copending applications; i.e., linking the wires to form an improved composite product.

In order to more fully understand the invention, reference should be had to the drawings, wherein FIGS. 1 through 4 are diagrammatic, schematic, sectional views of one preferred embodiment of the invention.

Figure 1:
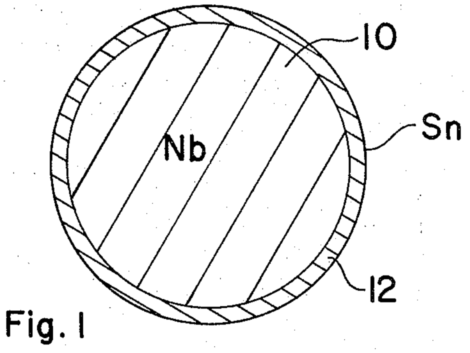
FIG. 1 is a diagrammatic, schematic, partially-sectional view of one embodiment of the invention.
Figure 2:
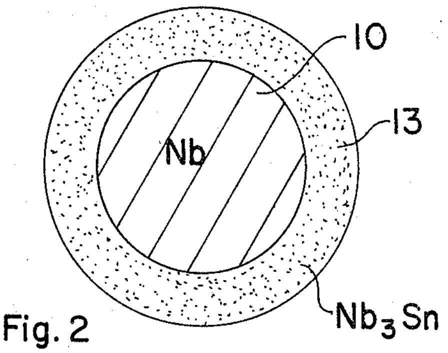
FIG. 2 is a diagrammatic, schematic, partially-sectional view of another embodiment of the invention showing complete diffusion of the tin layer.
Figure 3:
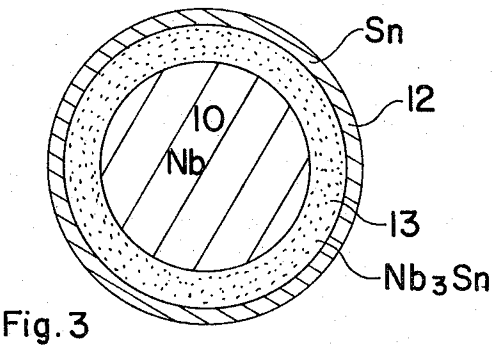
FIG. 3 is a diagrammatic, schematic, partially-sectional view of another embodiment of the invention showing partial diffusion of the tin layer.
Figure 4:
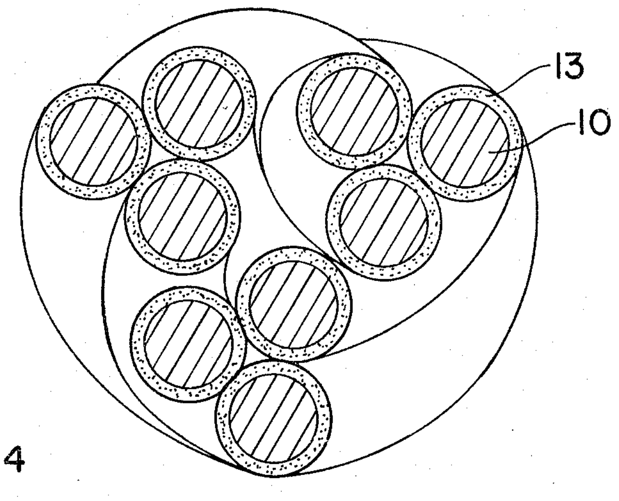
FIG. 4 is a diagrammatic, schematic, partially-sectional view of a multiplicity of wires, of the type illustrated in FIG. 2 which have been woven together to form a single braided superconductive cable.

In FIG. 1 there is illustrated a fine wire 10 formed of niobium having a layer 12 of tin on the outside thereof. In one preferred embodiment of the invention the layer of tin is about .0005 inch thick. In FIG. 2 the same wire 10 is illustrated after diffusion treatment at a temperature of 900° C. for a time of 16 hours. The tin layer 12 has essentially disappeared and is replaced by the reactive diffusion layer stratum 13 of $Nb_3Sn$. This stratum 13 is on the order of .0005 inch thick. In FIG. 3 is shown a product similar to the product of FIG. 2 except that the diffusion was stopped after 10 minutes so that a portion of the tin layer 12 still remains on the outside of the wire. In this case the diffusion of tin inwardly has created a $Nb_3Sn$ stratum between the remaining portion of the tin layer 12 and the unreacted niobium wire core. In FIG. 4 there is illustrated a multiplicity of wires, of the type illustrated in FIG. 2, which have been woven together to form a single braided superconductive cable.

One preferred method of practicing the invention is set forth in the following nonlimiting example:

*Example*

Lengths of niobium wires 0.003 inch thick are cleaned by dipping in a bath consisting of sulfuric acid and water, the bath being at a temperature of 80° C. Thereafter, the cleaned niobium wires are subjected to a tin plating bath of stannous fluoborate to deposit on the surface of the niobium wires a tin coating of about 0.0005 inch thick. The resultant tin-coated wires are then placed in a vacuum furnace and heated to a temperature of 900° C. and at a pressure of about 10 microns Hg abs. The wires are held at this temperature for approximately 64 hours and then cooled to room temperature. The wires are still flexible and can be formed into a coil. Nine wires were then woven together to form a single braided wire.

The braided wire was then repeatedly flexed around a ¼ inch radius. After flexing the braided wire was still sufficiently superconductive to provide a measured critical current of 30 amps at 4° K. for a 6000 gauss magnetic field. By critical current is meant the current which can be carried by the wire without any detectable resistance.

The wires were sectioned, polished and analyzed metallographically. The wires had the appearance schematically indicated in FIG. 2, the surface stratum of $Nb_3Sn$ being on the order of 0.0009 inch thick.

While one preferred embodiment has been described, numerous modifications thereof may be practiced without departing from the spirit of the invention. For example, the stratum of $Nb_3Sn$ can be formed by dipping the niobium containing substrate in a tin bath at a sufficiently elevated temperature for a sufficient time to effect diffusion of the tin and formation of the $Nb_3Sn$ layer of sufficient thickness without further heat treatment. The tin layer can be applied by many other techniques such as, for example, chemical reduction, vapor deposition, and the like. Also a suspension of tin powder in a subsequently volatile fluid can be formed and applied by painting, spraying and the like. Equally, the time and temperature of diffusion can be varied depending upon the ultimate desired thickness for the $Nb_3Sn$ stratum. A given amount of diffusion can be obtained by employing high temperatures and short times or conversely lower temperatures and longer times.

While the invention has been described initially in its utility for the production of wire, it can be equally applied for the production of superconductive tapes, ribbons or tubes. In this case, a niobium tape or ribbon, for example, can be treated to provide a layer of tin on one or both surfaces (one surface being preferred in some cases). Thereafter the above-described diffusion treatment is performed to provide the surface stratum of $Nb_3Sn$ having the requisite thickness. Equally, while it is preferred that the niobium be solid wire, the niobium can be merely a layer on top of another wire where strength or other factors are of importance.

As shown in FIG. 3, the $Nb_3Sn$ stratum does not have to be at the outermost surface of the niobium element, since there can be an outer layer, for example, of tin or any other protective coating depending upon the particular use of the product. Where tin forms the outer layer it also serves as an insulation for the adjacent superconductive $Nb_3Sn$ stratum at cryogenic temperatures.

Since certain changes may be made in the above product and process without departing from the scope of the invention herein involved, it is intended that all matter contained in the above description, or shown in the accompanying drawing, shall be interpreted as illustrative and not in a limiting sense.

What is claimed is:

As an article of manufacture, a superconductive coil formed from a wound braid having a diameter of about .003 inch and of wires, the wires in the braid comprising continuous conducting paths of $Nb_3Sn$ extending the length of the wire along the outer surface thereof, the braid being comprised solely of wires and void space throughout its cross section.

References Cited by the Examiner

UNITED STATES PATENTS

| | | | |
|---|---|---|---|
| 478,367 | 7/1892 | Sawyer | 174—34 |
| 546,005 | 9/1895 | Dior | 174—129 |
| 587,764 | 8/1897 | Short | 174—129 |
| 1,004,681 | 10/1911 | Parker | 87—8 |
| 2,218,085 | 10/1940 | Dorian | 174—114 |
| 2,958,836 | 11/1960 | McMahon | 307—88.5 |
| 3,124,455 | 3/1964 | Buehler et al. | 75—214 |
| 3,181,936 | 5/1965 | Denny et al. | 29—194 |

FOREIGN PATENTS

| | | |
|---|---|---|
| 356,232 | 9/1905 | France. |
| 425,789 | 3/1935 | Great Britain. |

OTHER REFERENCES

Chemistry and Engineering News, February 20, 1961, pp. 41 and 42.

ALFRED L. LEAVITT, *Primary Examiner.*

RICHARD D. NEVIUS, JOSEPH B. SPENCER, JOSEPH REBOLD, *Examiners.*

W. L. JARVIS, *Assistant Examiner.*